(12) United States Patent
Shikimachi (10) Patent No.: US 9,897,454 B2
(45) Date of Patent: Feb. 20, 2018

(54) HOST-VEHICLE-TRAVEL-POSITION SPECIFICATION APPARATUS AND HOST-VEHICLE-TRAVEL-POSITION SPECIFICATION PROGRAM PRODUCT

(71) Applicant: DENSO CORPORATION, Kariya, Aichi-pref. (JP)

(72) Inventor: Takeshi Shikimachi, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 37 days.

(21) Appl. No.: 15/109,770

(22) PCT Filed: Jan. 21, 2015

(86) PCT No.: PCT/JP2015/000248
§ 371 (c)(1),
(2) Date: Jul. 5, 2016

(87) PCT Pub. No.: WO2015/122121
PCT Pub. Date: Aug. 20, 2015

(65) Prior Publication Data
US 2016/0327400 A1    Nov. 10, 2016

(30) Foreign Application Priority Data
Feb. 12, 2014  (JP) ................... 2014-024297

(51) Int. Cl.
G01C 21/30  (2006.01)
G09B 29/10  (2006.01)
G01C 21/16  (2006.01)
G01C 21/26  (2006.01)

(52) U.S. Cl.
CPC ........... G01C 21/30 (2013.01); G01C 21/165 (2013.01); G09B 29/106 (2013.01); *G01C 21/26* (2013.01)

(58) Field of Classification Search
CPC .... G01C 21/30; G01C 21/005; G01C 21/367; G01C 21/3658; G01C 21/26
See application file for complete search history.

(56) References Cited

U.S. PATENT DOCUMENTS

| | | | |
|---|---|---|---|
| 2011/0118979 A1* | 5/2011 | Mao | G01C 21/005 701/532 |
| 2011/0320121 A1* | 12/2011 | Kang | G01C 21/3658 701/412 |
| 2013/0311086 A1* | 11/2013 | Aoki | G01C 21/30 701/446 |

FOREIGN PATENT DOCUMENTS

| | | |
|---|---|---|
| JP | 5241958 B2 | 7/2013 |
| JP | 2013156034 A | 8/2013 |

* cited by examiner

*Primary Examiner* — Dale Moyer
(74) *Attorney, Agent, or Firm* — Harness, Dickey & Pierce, P.L.C.

(57) ABSTRACT

The host-vehicle-travel-position specification apparatus specifies an estimation error range of map matching reference positions based on relation between a map-matching reference trajectory and an estimation error range of estimated absolute positions. The map-matching reference trajectory is corrected to accord with the estimation error range of map matching reference positions. A vehicle travel position is specified based on the corrected map-matching reference trajectory.

6 Claims, 9 Drawing Sheets

HOST-VEHICLE-TRAVEL-POSITION SPECIFICATION APPARATUS AND HOST-VEHICLE-TRAVEL-POSITION SPECIFICATION PROGRAM PRODUCT

CROSS REFERENCE TO RELATED APPLICATIONS

This application is a U.S. National Phase Application under 35 U.S.C. 371 of International Application No. PCT/JP2015/000248 filed on Jan. 21, 2015 and published in Japanese as WO 2015/122121 A1 on Aug. 20, 2015. This application is based on and claims the benefit of priority from Japanese Patent Application No. 2014-024297 filed on Feb. 12, 2014. The entire disclosures of all of the above applications are incorporated herein by reference.

TECHNICAL FIELD

The present disclosure relates to a host-vehicle-travel-position specification apparatus and a host-vehicle-travel-position specification program product to specify a host vehicle travel position on a map.

BACKGROUND ART

There is conventionally provided a host-vehicle-travel-position specification apparatus that specifies host vehicle travel positions on a map. Patent literature 1 discloses a technique that finds an angular difference between the direction of a traveling vehicle and the direction indicating road linearity when the vehicle travels a road including a fork road branching from a main road of an expressway. The technique specifies whether the host vehicle travel position corresponds to the main road or the fork road.

PRIOR ART LITERATURES

Patent Literature

Patent literature 1: JP 2013-156034 A

SUMMARY OF INVENTION

The technique in patent literature 1 specifies 15 degrees as the minimum standard for an angular difference between the main road and the fork road. Suppose that an angular difference between the direction of the traveling vehicle and the direction indicating the road linearity is smaller than 15 degrees. In this case, the technique specifies the host vehicle travel position on the main road and determines that the vehicle continues traveling the main road. Suppose that an angular difference between the direction of the traveling vehicle and the direction indicating the road linearity is larger than or equal to 15 degrees. In this case, the technique specifies the host vehicle travel position on the fork road and determines that the vehicle enters the fork road from the main road.

There may however be a location where a main road and a fork road are constructed to form an angular difference smaller than 15 degrees. A main road including several lanes may be subject to a difficulty in accurately determining whether an angular difference smaller than 15 degrees between the direction of the traveling vehicle and the direction indicating the road linearity signifies changing lanes on the main road or branching to a fork road from the main road. Meanwhile, there may be a technique that provides equipment such as an image capture apparatus to capture images ahead of a vehicle to acquire information outside the vehicle, analyzes the acquired information outside the vehicle, and specifies a host vehicle travel position. The technique requires the equipment to acquire information outside the vehicle and may complicate configurations or increase costs.

It is an object of the present disclosure to provide a host-vehicle-travel-position specification apparatus and a host-vehicle-travel-position specification program product capable of accurately specifying host vehicle travel positions on a map without the need for equipment to acquire information outside a vehicle.

To achieve the above object, an example of the present disclosure, a host-vehicle-travel-position specification apparatus is provided to include a position calculation section, a map matching section, a first range specification section, a second range specification section, a correction section, and a travel position specification section. The position calculation section calculates a current vehicle position of a vehicle. The map matching section map matches the current vehicle position to a road in map data and specifies a map-matching reference trajectory. The first range specification section specifies an estimation error range of estimated absolute positions containing an estimated absolute trajectory. The second range specification section specifies an estimation error range of map matching reference positions based on relation between the map-matching reference trajectory and the estimation error range of estimated absolute positions on condition that the map matching section continues to map match the current vehicle position to one road longer than or equal to a specified distance. The correction section corrects the map-matching reference trajectory in accordance with the estimation error range of map matching reference positions. The travel position specification section specifies a vehicle travel position of the vehicle based on the map-matching reference trajectory corrected by the correction section.

The host-vehicle-travel-position specification apparatus specifies an estimation error range of map matching reference positions by determining in which direction (right or left) a map-matching reference trajectory deviates from the estimated absolute trajectory. The host-vehicle-travel-position specification apparatus corrects the map-matching reference trajectory in accordance with the estimation error range of map matching reference positions. The host-vehicle-travel-position specification apparatus specifies a vehicle travel position based on the corrected map-matching reference trajectory. The host-vehicle-travel-position specification apparatus specifies a direction in which the map-matching reference trajectory deviates from the estimated absolute trajectory. The host-vehicle-travel-position specification apparatus corrects the map-matching reference trajectory in the specified direction to accurately specify the vehicle travel position. The host-vehicle-travel-position specification apparatus can accurately specify a host vehicle travel position on a map without the need for equipment to acquire information outside a vehicle such as an image capture apparatus to capture images ahead of the vehicle.

BRIEF DESCRIPTION OF DRAWINGS

The above and other objects, features and advantages of the present disclosure will become more apparent from the following detailed description made with reference to the accompanying drawings. In the drawings.

DESCRIPTION OF EMBODIMENTS

Figure 1:
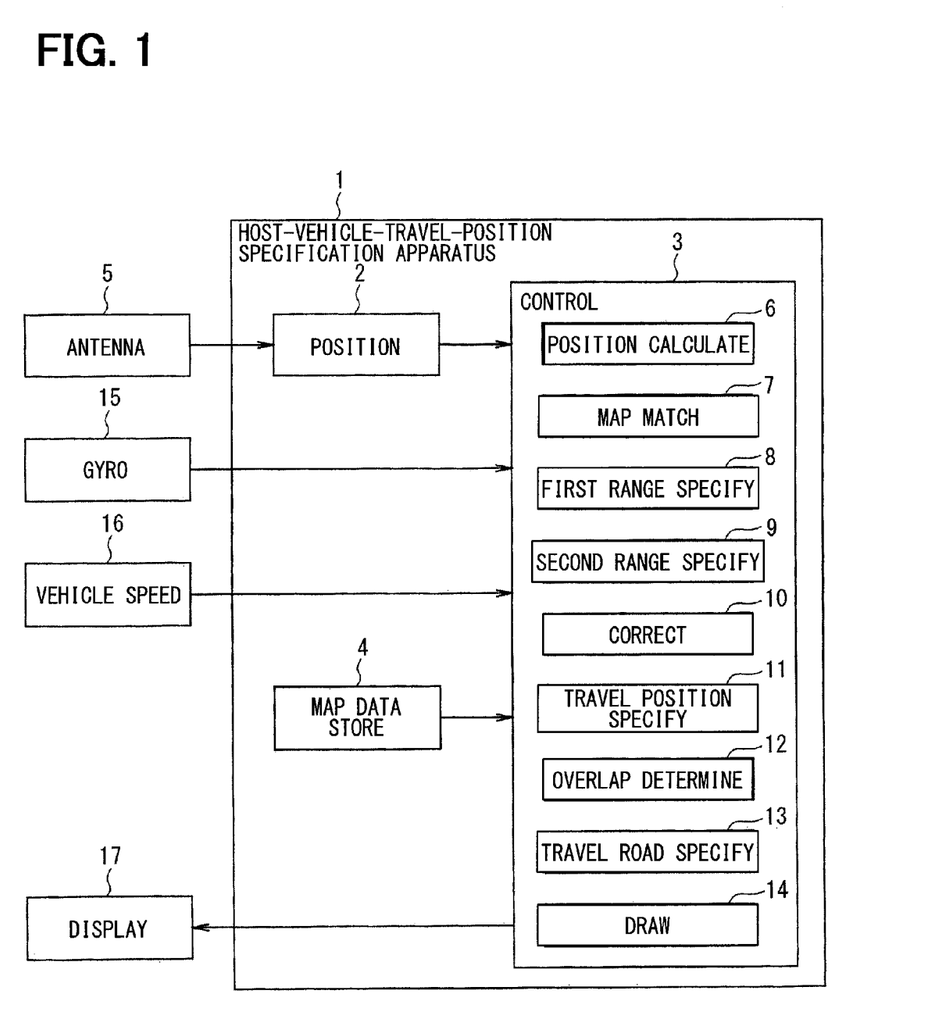
FIG. 1 is a function block diagram illustrating an embodiment of the disclosure.

An embodiment of the present invention will be described with reference to the accompanying drawings. A host-vehicle-travel-position specification apparatus 1 is mounted on a vehicle (automobile). The vehicle where the host-vehicle-travel-position specification apparatus 1 is mounted is also referred to as a host vehicle. The host-vehicle-travel-position specification apparatus 1 includes a GNSS (Global Navigation Satellite System) positioning instrument 2, a control circuit 3, and a map data storage instrument 4. A GNSS antenna 5 receives a GPS signal from a GPS (Global Positioning System) satellite as an example of GNSS. The GNSS positioning instrument 2 extracts various parameters from the GPS signal, calculates latitude-longitude information, and outputs the calculated latitude-longitude information to the control circuit 3.

According to functions to perform, the control circuit 3 includes a position calculation section 6 (also referred to as a position calculation device), a map matching section 7 (also referred to as a map matching device), a first range specification section 8 (also referred to as a first range specification device), a second range specification section 9 (also referred to as a second range specification device), a correction section 10 (also referred to as a correction device), a travel position specification section 11 (also referred to as a travel position specification device), an overlap determination section 12 (also referred to as an overlap determination device), a travel road specification section 13 (also referred to as a travel road specification device), and a drawing section 14 (also referred to as a display control section 14 or a drawing device). All or part of the sections may be provided as hardware components. The host-vehicle-travel-position specification program product can be provided by being stored in a non-transition computer-readable storage medium.

A gyro sensor 15 detects the vehicle orientation and outputs a detection signal indicating the detected vehicle orientation to the control circuit 3. A vehicle speed pulse output instrument 16 outputs a vehicle speed pulse signal indicating a vehicle speed pulse to the control circuit 3. The position calculation section 6 calculates the current vehicle position, speed, and orientation based on the latitude-longitude information input from the GNSS positioning instrument 2, the detection signal input from the gyro sensor 15, and the vehicle speed pulse signal input from the vehicle speed pulse output instrument 16. The position calculation section 6 may calculate the current vehicle position, speed, and orientation also based on an acceleration detected by a G sensor that detects an acceleration applied to the vehicle.

The map matching section 7 reads map data from the map data storage instrument 4. The position calculation section 6 calculates a current vehicle position at a specified time interval or a specified distance interval. The map matching section 7 map matches the calculated current vehicle position to a road in map data and specifies a map-matching reference trajectory. The reference trajectory can be generated based on the latest calculated vehicle position and at least a vehicle position most recently calculated at the specified time interval or the specified distance interval. The map data read from the map data storage instrument 4 contains various types of information such as road types (such as expressway and ordinary road), the number of lanes on a road, and intersections.

The first range specification section 8 is also referred to as an absolute position range specification section. The first range specification section 8 specifies an estimated absolute trajectory (an absolute trajectory unrelated to map data) based on the latitude-longitude information input from the GNSS positioning instrument 2, the detection signal input from the gyro sensor 15, and the vehicle speed pulse signal input from the vehicle speed pulse output instrument 16. Relatively increasing the map matching accuracy in the map matching section 7 relatively decreases a difference between the map-matching reference trajectory and the estimated absolute trajectory. Relatively decreasing the map matching accuracy in the map matching section 7 relatively increases a difference between the map-matching reference trajectory and the estimated absolute trajectory. The first range specification section 8 specifies an "estimation error range of estimated absolute positions" (also referred to as a "first estimation error range" or an "absolute position range") containing the specified estimated absolute trajectory. The estimation error range of estimated absolute positions forms a circle that is centered on the beginning of the estimated absolute trajectory and has a radius equal to a first predetermined distance.

The second range specification section 9 is also referred to as a reference position range specification section. The second range specification section 9 specifies an "estimation error range of map matching reference positions" (also referred to as a "second estimation error range" or a "map matching reference position range") based on the relation between a map-matching reference trajectory specified by the map matching section 7 and an estimation error range of estimated absolute positions specified by the first range specification section 8. The estimation error range of map matching reference positions forms a circle that is centered on the beginning of the map-matching reference trajectory and has a radius equal to a second predetermined distance shorter than the first predetermined distance. Namely, the estimation error range of map matching reference positions is narrower than the estimation error range of estimated absolute positions. The second range specification section 9 determines the second predetermined distance depending on the width of a road to which the current vehicle position is matched. For example, suppose that the current vehicle position is map-matched to a road that has four lanes each way. In this case, the second range specification section 9 determines the second predetermined distance so that the estimation error range of map matching reference positions covers two lanes.

The correction section 10 is also referred to as a reference trajectory correction section. The correction section 10 corrects the map-matching reference trajectory specified by the map matching section 7 with reference to the estimation error range of map matching reference positions specified by the second range specification section 9. For example, suppose that the current vehicle position is map-matched to a road having four lanes each way and that the estimation error range of map matching reference positions is specified to overlap with two lanes to the right of the vehicle travel direction. In this case, the correction section 10 corrects the map-matching reference trajectory so as to follow the center of the two lanes. The travel position specification section 11 specifies a vehicle travel position based on a map-matching reference trajectory (also referred to as a corrected reference trajectory) corrected by the correction section 10.

The overlap determination section 12 is also referred to as an overlapping road determination section. The overlap determination section 12 determines whether only one road overlaps with the estimation error range as a reference position including the map-matching reference trajectory corrected by the correction section 10. Suppose that the overlap determination section 12 determines that a sole road overlaps with the estimation error range as a reference position including the corrected map-matching reference trajectory. In this case, the travel road specification section 13 specifies the sole road as a travel road. The drawing section 14 controls the display instrument 17 to display a current position mark indicating the current vehicle position or a travel trajectory on a map generated from map data read from the map data storage instrument 4.

The host-vehicle-travel-position specification apparatus 1 switches between an active state and an inactive state in interlock with an ACC (accessory) switch of the vehicle, for example. The control circuit 3 changes the host-vehicle-travel-position specification apparatus 1 from the inactive state to the active state when determining a change in the ACC switch from the off to on state. The control circuit 3 changes the host-vehicle-travel-position specification apparatus 1 from the active state to the inactive state when determining a change in the ACC switch from the on to off state.

Effects of the configuration will be described with reference to FIGS. 2 through 15. When the host-vehicle-travel-position specification apparatus 1 is active, the control circuit 3 according to the disclosure performs a map matching process, a process to specify an estimation error range of estimated absolute positions, a map-matching reference trajectory correction process, and a travel road specification process each at a specified cycle. The processes will be described in order. Suppose that a vehicle travels the main road of an expressway.

It is noted that a flowchart or the processing of the flowchart in the present application includes sections (also referred to as steps), each of which is represented, for instance, as S1. Further, each section can be divided into several sub-sections while several sections can be combined into a single section. Furthermore, each of thus configured sections can be also referred to as a device or module. Each or any combination of sections explained in the above can be achieved as (i) a software section in combination with a hardware unit (e.g., computer) or (ii) a hardware section, including or not including a function of a related apparatus. Furthermore, the hardware section (e.g., integrated circuit, hard-wired logic circuit) may be constructed inside of a microcomputer. Furthermore, the section may be included in instructions contained in a program product; the instructions are read and executed by a computer.

Figure 2:
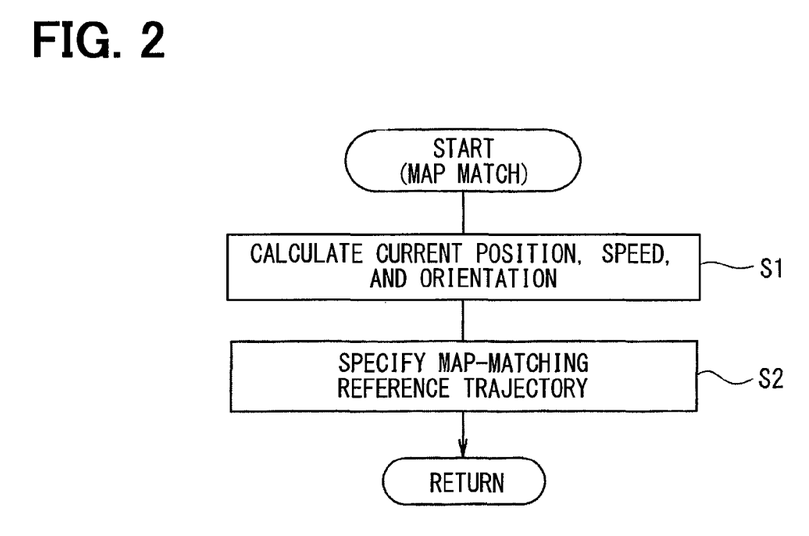
FIG. 2 is a flowchart (part 1)

(1) Map Matching Process (See FIG. 2)

When the map matching process starts, the control circuit 3 allows the position calculation section 6 to calculate a current vehicle position, speed, and orientation based on latitude-longitude information input from the GNSS positioning instrument 2, a detection signal input from the gyro sensor 15, and a vehicle speed pulse signal input from the vehicle speed pulse output instrument 16 (S1 as a first procedure). The control circuit 3 reads map data from the map data storage instrument 4 and allows the map matching section 7 to map match the current vehicle position to a road in the map data. The control circuit 3 specifies a map-matching reference trajectory (S2 as a second procedure) and terminates the map matching process.

Figure 3:
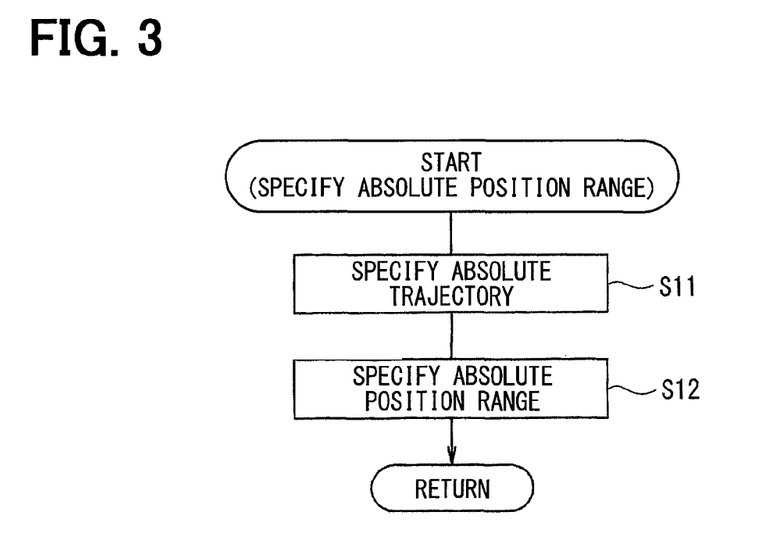
FIG. 3 is a flowchart (part 2)

(2) Process to Specify an Estimation Error Range of Estimated Absolute Positions (see FIG. 3)

When the process to specify an estimation error range of estimated absolute positions starts, the control circuit 3 allows the first range specification section 8 to specify an estimated absolute trajectory based on latitude-longitude information input from the GNSS positioning instrument 2, a detection signal input from the gyro sensor 15, and a vehicle speed pulse signal input from the vehicle speed pulse output instrument 16 (S11). The control circuit 3 allows the first range specification section 8 to specify an estimation error range of estimated absolute positions including the specified estimated absolute trajectory (S12 as a third procedure) and terminates the process to specify an estimation error range of estimated absolute positions.

Figure 4:
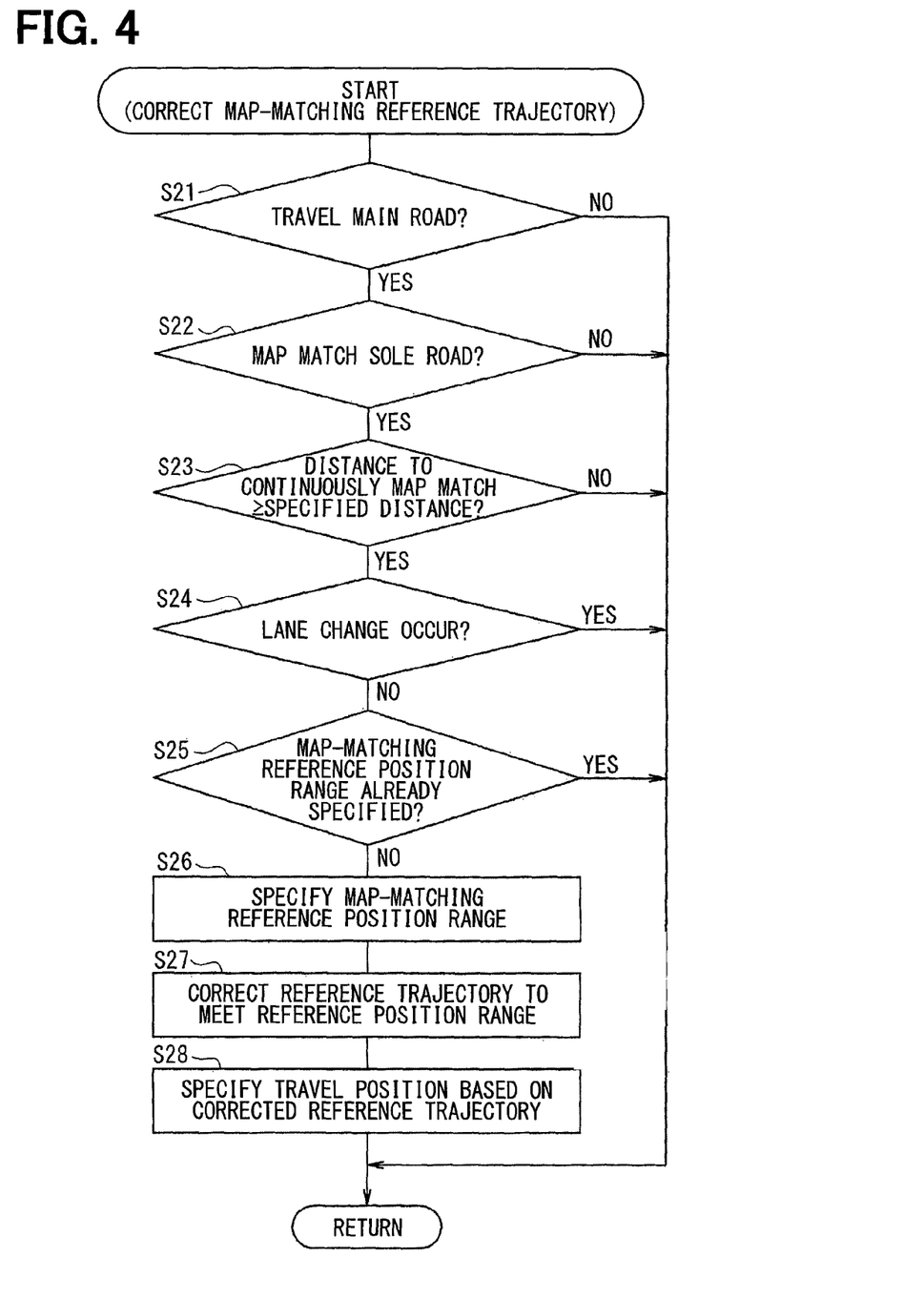
FIG. 4 is a flowchart (part 3)

(3) Map-Matching Reference Trajectory Correction Process (see FIG. 4)

When the map-matching reference trajectory correction process starts, the control circuit 3 determines a road type of the map data read from the map data storage instrument 4 in (1) the map matching process. The map matching section 7 allows the map matching section 7 to determine whether the vehicle is traveling the main road of the expressway (S21). When determining that the vehicle is traveling the main road (S21: YES), the control circuit 3 allows the map matching section 7 to determine whether (1) the map matching process map matches a sole road (S22).

When determining that a road (target road) to map match is only one (S22: YES), the control circuit 3 allows the map matching section 7 to determine whether the sole target road has a distance to continue map matching or, namely, a distance to continuously keep track of the sole target road without deviating from it, is longer than or equal to a specified distance (e.g., several hundreds of meters) (S23). In this case, the control circuit 3 may identify the specified distance as a determination reference with a fixed value independent of a vehicle speed or a variable value dependent on a vehicle speed. When a variable value dependent on a vehicle speed is used for the specified distance as a determination reference, the control circuit 3 may determine the specified distance to be relatively long corresponding to a relatively high vehicle speed or may determine the specified distance to be relatively short corresponding to a relatively low vehicle speed.

When determining that the distance to continue map matching is longer than or equal to the specified distance (S23: YES), the control circuit 3 allows the map matching section 7 to determine whether a lane change occurs until the distance to continue map matching reaches the specified distance (S24).

When determining that no lane change occurs (S24: NO), the control circuit 3 determines whether an estimation error range of map matching reference positions is already specified (S25). When determining that an estimation error range of map matching reference positions is not specified (S25: NO), the control circuit 3 allows the second range specification section 9 to specify an estimation error range of map matching reference positions based on the relation between the map-matching reference trajectory and the estimation error range of estimated absolute positions (S26 as a fourth procedure).

Figure 6:
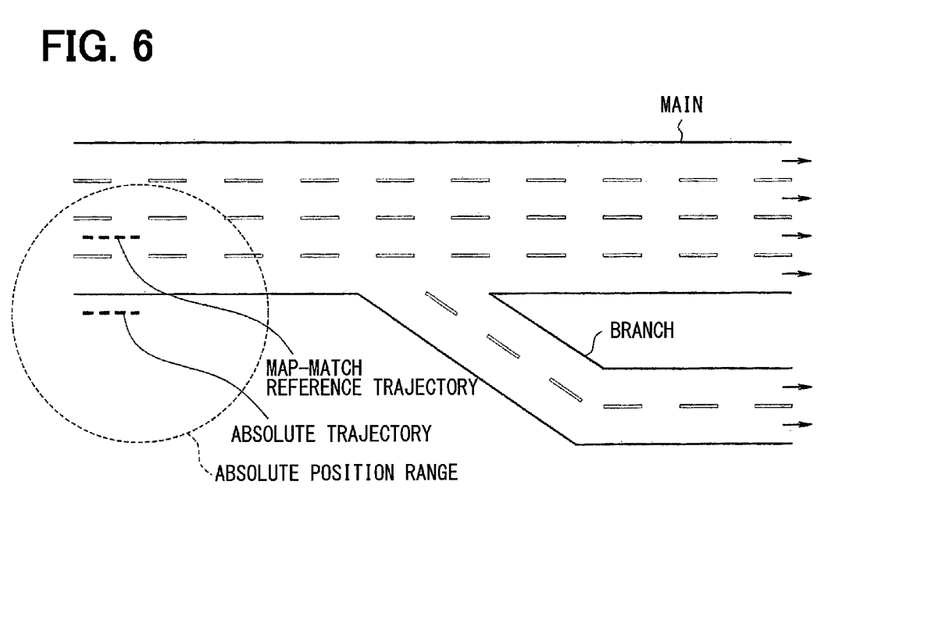
FIG. 6 is a diagram illustrating an estimation error range of estimated absolute positions (part 1)
Figure 7:
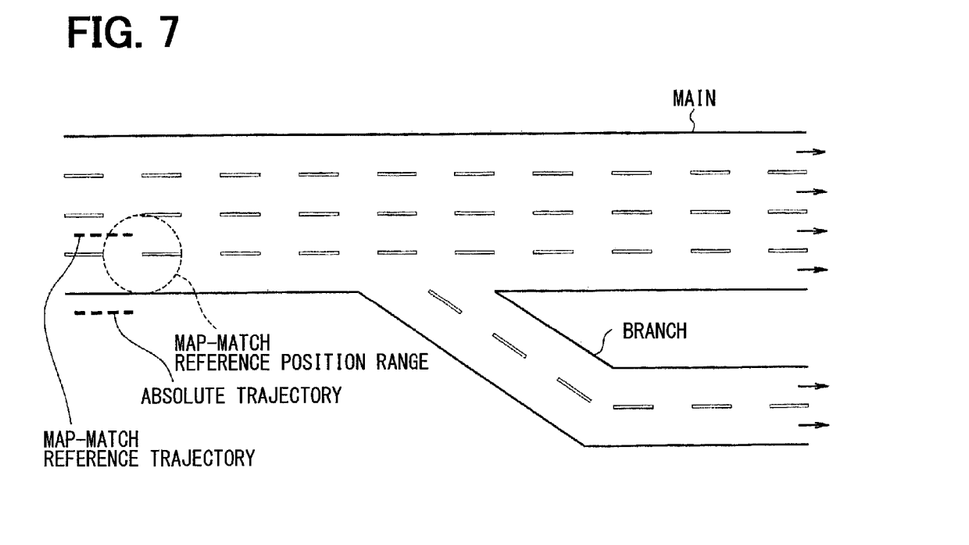
FIG. 7 is a diagram illustrating an estimation error range of map matching reference positions (part 1)
Figure 8:
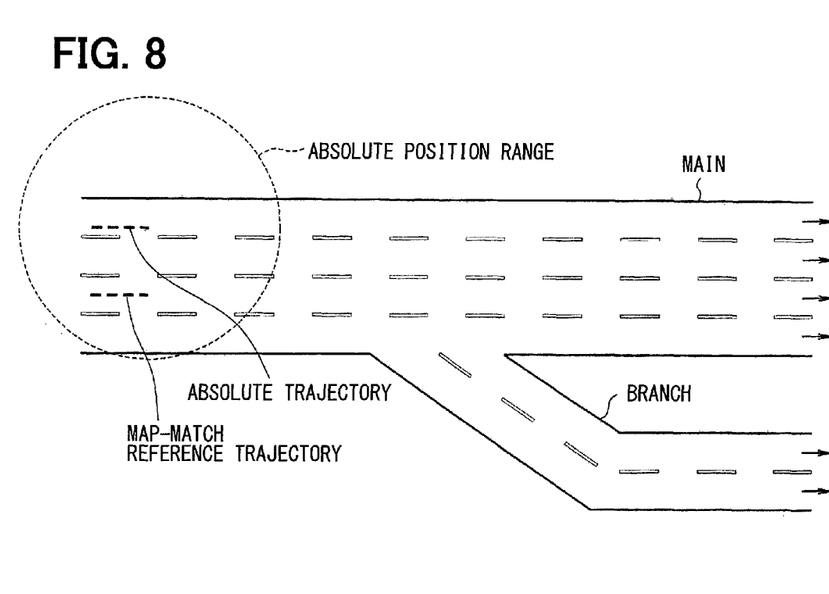
FIG. 8 is a diagram illustrating an estimation error range of estimated absolute positions (part 2)
Figure 9:
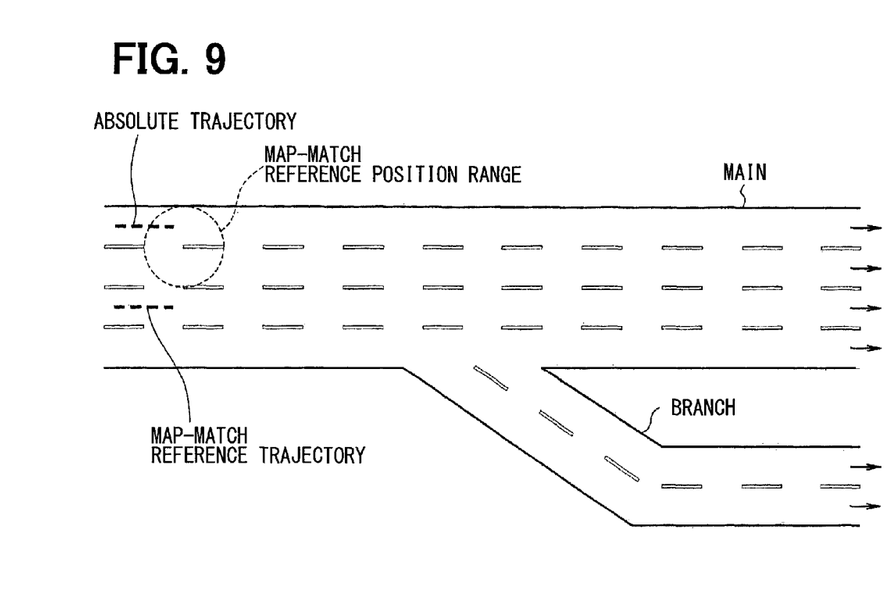
FIG. 9 is a diagram illustrating an estimation error range of map matching reference positions (part 2)
Figure 10:
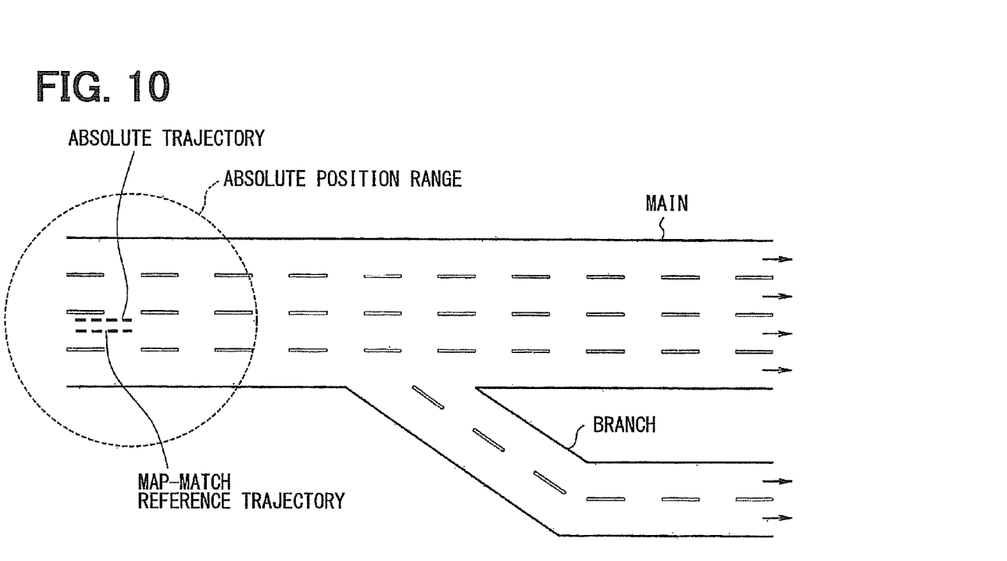
FIG. 10 is a diagram illustrating an estimation error range of estimated absolute positions (part 3)
Figure 11:
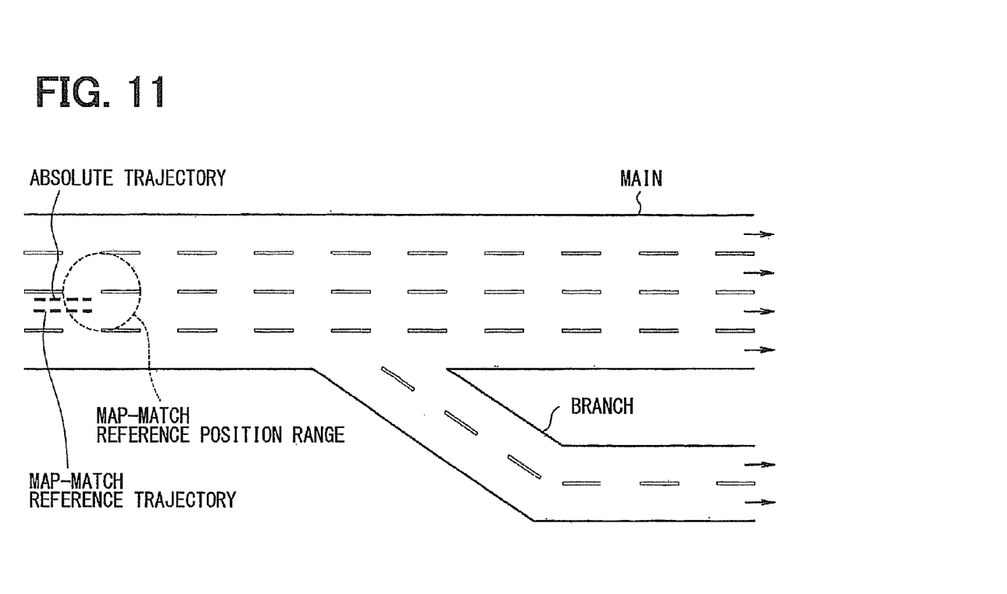
FIG. 11 is a diagram illustrating an estimation error range of map matching reference positions (part 3)
Figure 12:
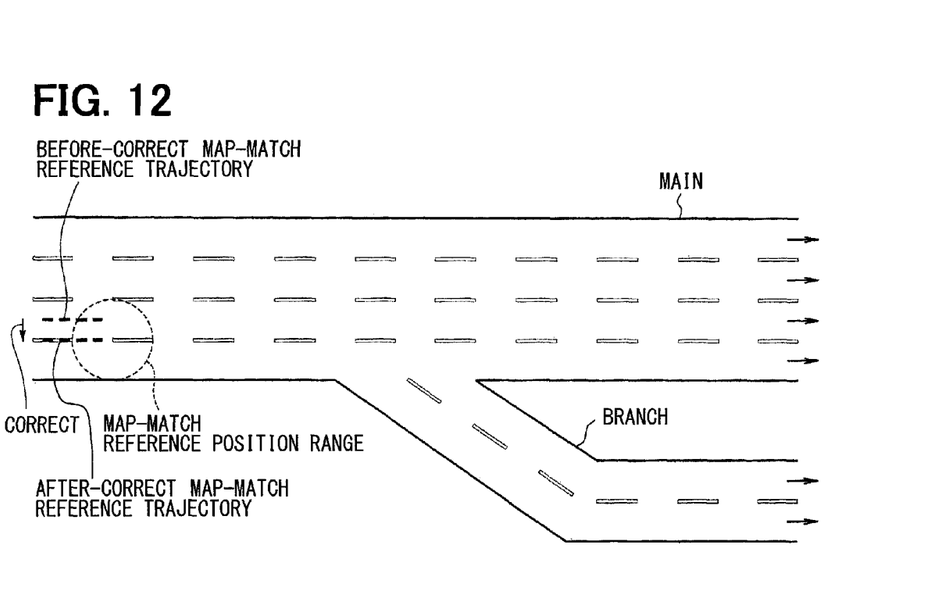
FIG. 12 is a diagram illustrating map matching reference trajectories before and after correction.

Specifically, as in FIG. 6, the control circuit 3 specifies an estimated absolute trajectory (hereinafter referred to as ABSOLUTE TRAJECTORY in the drawing) at a position deviating from the map-matching reference trajectory (hereinafter referred to as MAP-MATCH REFERENCE TRAJECTORY in the drawing) to the right of the vehicle travel direction in the estimation error range of estimated absolute positions (hereinafter referred to ABSOLUTE POSITION RANGE in the drawing). As in FIG. 7, the control circuit 3 specifies a range of two out of four lanes to the right in the main road as an estimation error range of map matching reference positions (hereinafter referred to as MAP-MATCH REFERENCE POSITION RANGE in the drawing). As in FIG. 8, the control circuit 3 may specify an estimated absolute trajectory at a position deviating from the map-matching reference trajectory to the left of the vehicle travel direction (a position deviating from the main road to the left or a position approaching the left of the main road). In this case, as in FIG. 9, the control circuit 3 specifies a range of two out of four lanes to the left in the main road as an estimation error range of map matching reference positions. As in FIG. 10, the control circuit 3 may specify an estimated absolute trajectory at a position that deviates from the map-matching reference trajectory to the left or right of the vehicle travel direction but approximates to the center of the main road. In this case, as in FIG. 11, the control circuit 3 specifies a range of two out of four lanes at the center of the main road as an estimation error range of map matching reference positions. The control circuit 3 specifies the estimation error range of map matching reference positions according to the width (the number of lanes) of a road to which the current vehicle position is map matched.

The control circuit 3 allows the correction section 10 to correct the map-matching reference trajectory in accordance with the specified estimation error range of map matching reference positions (S27 as a fifth procedure). Specifically, as in FIG. 7, the control circuit 3 specifies the range of two out of four lanes to the right in the main road as the estimation error range of map matching reference positions. In this case, as in FIG. 12, the control circuit 3 corrects the map-matching reference trajectory (by moving it to the right of the vehicle travel direction) so that the map-matching reference trajectory passes through the center of the estimation error range of map matching reference positions. The same applies when the control circuit 3 specifies the range of two out of four lanes to the left in the main road as the estimation error range of map matching reference positions as in FIG. 9. The same also applies when the control circuit 3 specifies the range of two out of four lanes at the center of the main road as the estimation error range of map matching reference positions.

The control circuit 3 allows the travel position specification section 11 to specify a vehicle travel position based on the corrected map-matching reference trajectory (S28 as a sixth procedure) and terminates the map-matching reference trajectory correction process. The control circuit 3 may determine that the vehicle does not travel the main road (S21: NO), more than one road is map matched (S22: NO), or the distance to continue map matching is not longer than or equal to the specified distance (S23: NO). In such a case, the control circuit 3 terminates the map-matching reference trajectory correction process without correcting the map-matching reference trajectory. The control circuit 3 may determine that a lane change occurs until the distance to continue map matching reaches the specified distance (S24: YES) or the estimation error range of map matching reference positions is already specified (S25: YES). In such a case, the control circuit 3 also terminates the map-matching reference trajectory correction process without correcting the map-matching reference trajectory.

Figure 5:
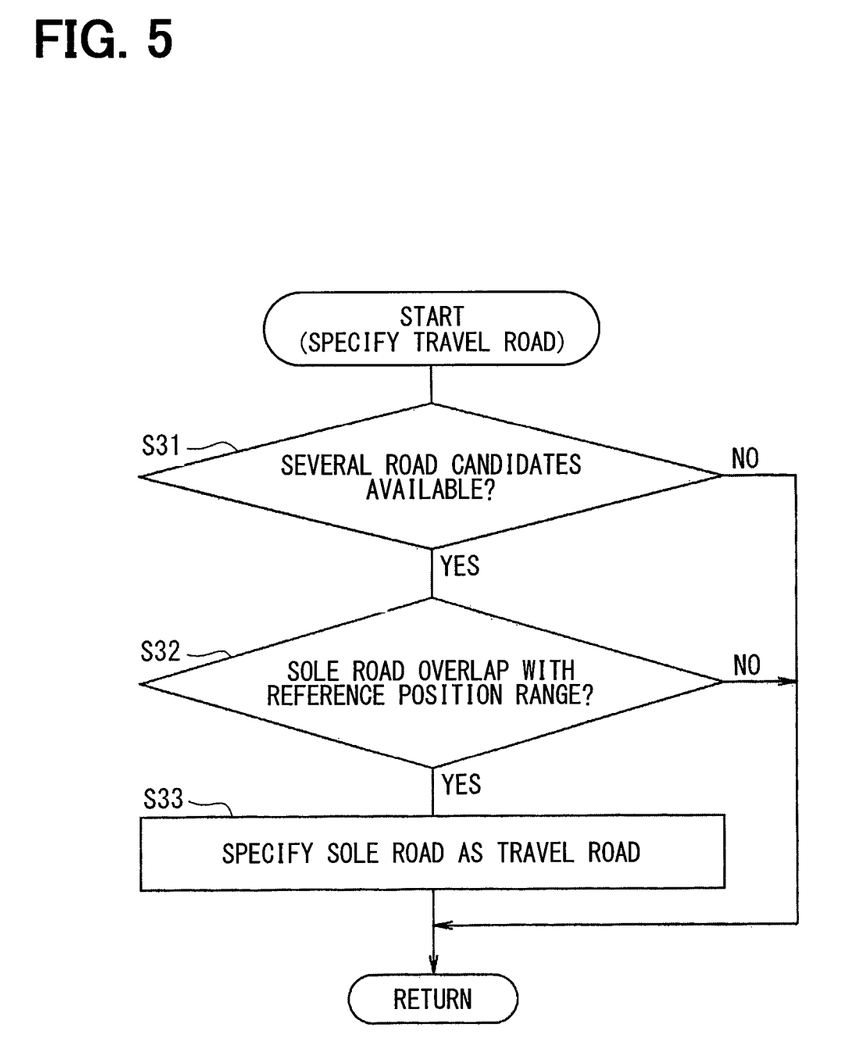
FIG. 5 is a flowchart (part 4)

(4) Travel Road Specification Process (see FIG. 5)

When the travel road specification process starts, the control circuit 3 determines whether several travel road candidates are available (S31). The control circuit 3 determines whether several travel road candidates are available by determining a possibility of the vehicle to travel a branch point based on the vehicle travel position specified in (3) the map-matching reference trajectory correction process and the map data read from the map data storage instrument 4.

The control circuit 3 may determine that the vehicle is relatively more likely to travel a branch point of the road and several road candidates are available (S31: YES). In this case, the control circuit 3 allows the overlap determination section 12 to determine whether the sole road overlaps with the estimation error range of map matching reference positions (S32 as a seventh procedure). The control circuit 3 may determine that the sole road overlaps with the estimation error range of map matching reference positions (S32: YES). In this case, the control circuit 3 specifies the road determined to be the sole one as a travel road (S33 as an eighth procedure) and terminates the travel road specification process.

Figure 13:
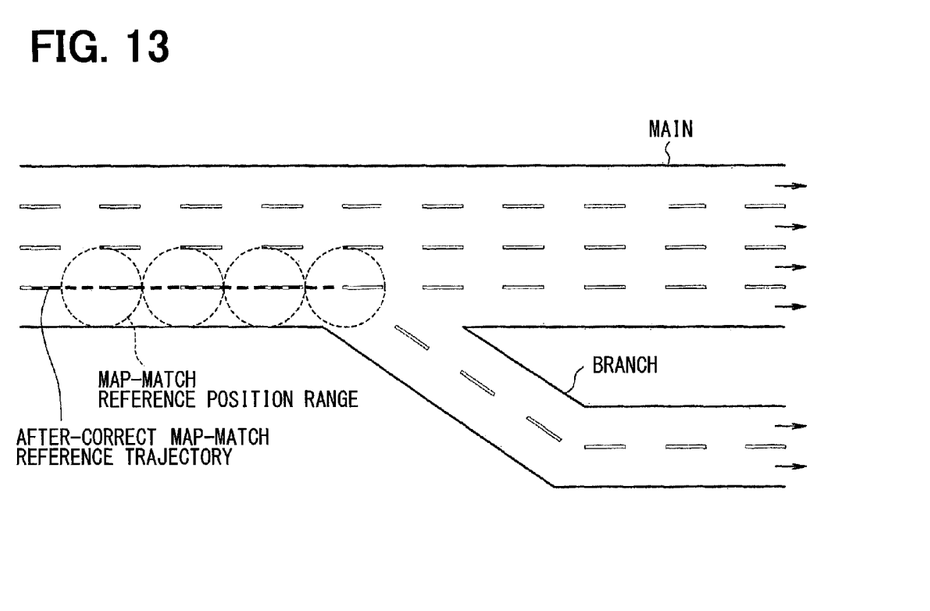
FIG. 13 is a diagram illustrating transition of map matching reference trajectories (part 1)
Figure 14:
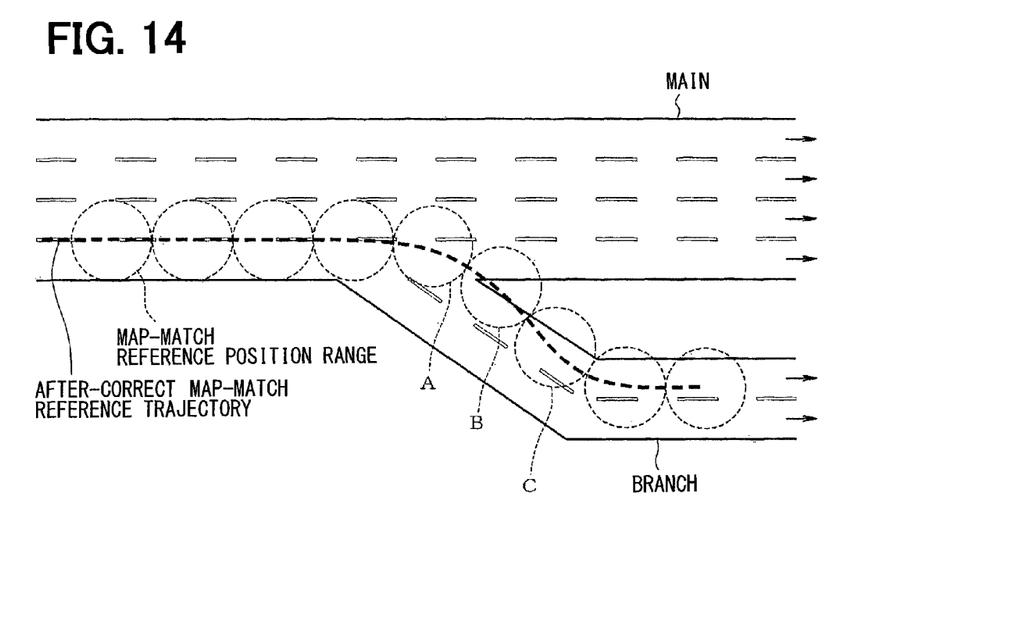
FIG. 14 is a diagram illustrating transition of map matching reference trajectories (part 2)
Figure 15:
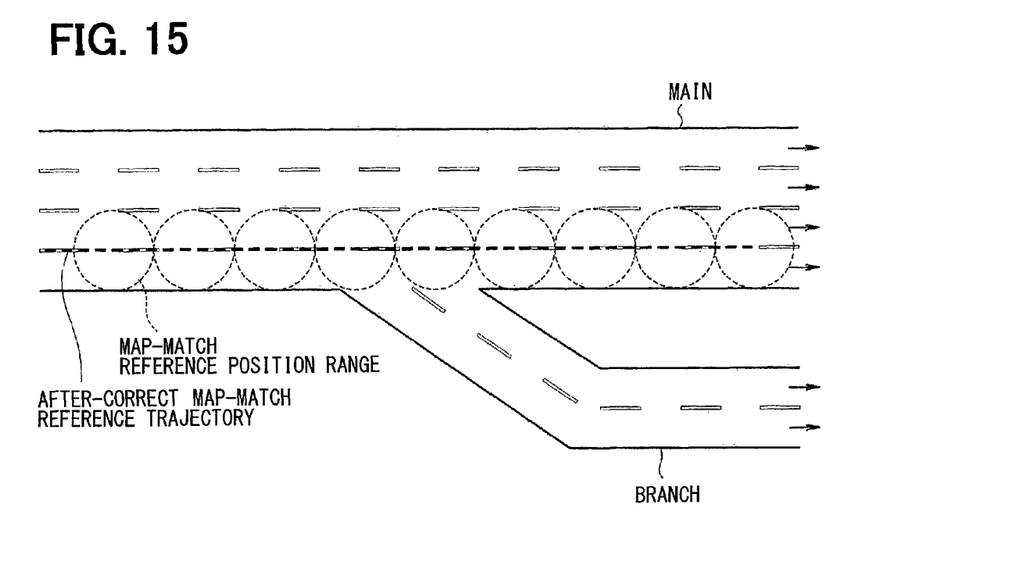
FIG. 15 is a diagram illustrating transition of map matching reference trajectories (part 3).

As in FIG. 13, the control circuit 3 extends the map-matching reference trajectory while the vehicle travels the road. The control circuit 3 continues to specify the estimation error range of map matching reference positions. In this case, the sole road (only the main road) overlaps with the estimation error range of map matching reference positions until range "A" in FIG. 14 is specified as the estimation error range. The control circuit 3 identifies the sole road (main road) with the travel road.

In contrast, the control circuit 3 specifies range "B" in FIG. 14 as the estimation error range of map matching reference positions while the vehicle further travels the road. In this case, more than one road (main road and fork road) overlaps with the estimation error range of map matching reference positions. No travel road is specified at this time. The control circuit 3 specifies range "C" in FIG. 14 as the estimation error range of map matching reference positions while the vehicle further travels the road. The sole road (fork road only) overlaps with the estimation error range. The control circuit 3 specifies the sole road (fork road) as a travel road, namely, determines that the vehicle enters the fork road from the main road. As in FIG. 15, the control circuit 3 may continue to specify the estimation error range of map matching reference positions. The sole road (main road only) continues to overlap with the estimation error range. The control circuit 3 continues to identify the sole road (main road) with the travel road, namely, determines that the vehicle continues to travel the main road.

The control circuit 3 may determine that the vehicle is relatively less likely to travel a branch point of the road and several road candidates are unavailable (S31: NO). In this case, the control circuit 3 terminates the travel road specification process without specifying a travel road. The control circuit 3 may determine that the sole road does not overlap with the estimation error range of map matching reference positions (S32: NO). The control circuit 3 terminates the travel road specification process without specifying a travel road.

According to the embodiment as above, the host-vehicle-travel-position specification apparatus 1 specifies an estimation error range of map matching reference positions by determining in which direction (right or left) a map-matching reference trajectory deviates from the estimated absolute trajectory. The host-vehicle-travel-position specification apparatus 1 corrects the map-matching reference trajectory in accordance with the estimation error range of map matching reference positions. The host-vehicle-travel-position specification apparatus 1 specifies a vehicle travel position based on the corrected map-matching reference trajectory. The host-vehicle-travel-position specification apparatus 1 can accurately specify a vehicle travel position without the need for equipment to acquire information outside a vehicle such as an image capture apparatus to capture images ahead of the vehicle.

When the vehicle makes a lane change until the distance to continue map matching reaches a specified distance, the accuracy of specifying the vehicle travel position may be decreased. Thus, the host-vehicle-travel-position specification apparatus 1 specifies an estimation error range of map matching reference positions under the condition that the vehicle makes no lane change. This enables to avoid a decrease in the accuracy of specifying the vehicle travel position due to a lane change made by the vehicle.

The host-vehicle-travel-position specification apparatus 1 finds the sole road overlapping with the estimation error range of map matching reference positions and identifies the sole road with a travel road. The host-vehicle-travel-position specification apparatus 1 can accurately specify the vehicle travel road after specifying the vehicle travel position and accurately determine whether the vehicle enters a fork road from a main road or continues traveling the main road.

The disclosure is not limited to the embodiment but may be modified or enhanced as follows.

The second range specification section 9 may specify an estimation error range of map matching reference positions based on any criteria. Namely, the second range specification section 9 may specify an estimation error range of map matching reference positions in units of distances (e.g., a distance in the width direction with reference to the center line of a road), not in units of lanes, if a direction (e.g., to the right, left, or center of a road) to correct the map-matching reference trajectory can be specified.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A host-vehicle-travel-position specification apparatus comprising:

a position calculation section that calculates a current vehicle position of a vehicle;

a map matching section that map matches the current vehicle position to a road in map data and specifies a map-matching reference trajectory;

a first range specification section that specifies an estimation error range of estimated absolute positions containing an estimated absolute trajectory;

a second range specification section that specifies an estimation error range of map matching reference positions based on relation between the map-matching reference trajectory and the estimation error range of estimated absolute positions on condition that the map matching section continues to map match the current vehicle position to one road longer than or equal to a specified distance;

a correction section that corrects the map-matching reference trajectory in accordance with the estimation error range of map matching reference positions; and a travel position specification section that specifies a vehicle travel position of the vehicle based on the map-matching reference trajectory corrected by the correction section.

2. The host-vehicle-travel-position specification apparatus according to claim 1,
wherein
the second range specification section specifies the estimation error range of map matching reference positions based on relation between the map-matching reference trajectory and the estimation error range of estimated absolute positions on condition that the map matching section continues to map match the current vehicle position to the road longer than or equal to the specified distance and the vehicle does not make a lane change until the distance to continue map matching reaches the specified distance.

3. The host-vehicle-travel-position specification apparatus according to claim 1, further comprising:

an overlap determination section that determines whether only one road overlaps with the estimation error range of map matching reference positions; and a travel road specification section that identifies a travel road with a road the overlap determination section determines to be only one road overlapping with the estimation error range of map matching reference positions.

4. A host-vehicle-travel-position specification program product stored in a non-transitory computer-readable storage medium, the program product including instructions read and executed by a control circuit having a computer,
the instructions comprising:

a first procedure that calculates a current vehicle position of a vehicle;

a second procedure that map matches the current vehicle position to a road in map data and specifies a map-matching reference trajectory;

a third procedure that specifies an estimation error range of estimated absolute positions containing an estimated absolute trajectory;

a fourth procedure that specifies an estimation error range of map matching reference positions based on relation between the map-matching reference trajectory specified by the second procedure and the estimation error range of estimated absolute positions specified by the third procedure on condition that the second procedure continues to map match the current vehicle position to one road longer than or equal to a specified distance;

a fifth procedure that corrects the map-matching reference trajectory specified by the second procedure in accordance with the estimation error range of map matching reference positions specified by the fourth procedure; and a sixth procedure that specifies a vehicle travel position of the vehicle based on the map-matching reference trajectory corrected by the fifth procedure.

5. The host-vehicle-travel-position specification program product according to claim 4, the instructions in which the fourth procedure specifies the estimation error range of map matching reference positions based on relation between the map-matching reference trajectory specified by the second procedure and the estimation error range of estimated absolute positions specified by the third procedure on condition that the second procedure continues to map match the current vehicle position to the road longer than or equal to the specified distance and the vehicle does not make a lane change until the distance to continue map matching reaches the specified distance.

6. The host-vehicle-travel-position specification program product according to claim 4, the instructions further comprising:

a seventh procedure that determines whether only one road overlaps with the estimation error range of map matching reference positions specified by the fourth procedure; and an eighth procedure that identifies a travel road with a road the seventh procedure determines to be only one road overlapping with the estimation error range of map matching reference positions.

* * * * *